RECLINING AND ROCKING CHAIR

Original Filed Feb. 8, 1965 3 Sheets-Sheet 1

INVENTOR.
PETER S. FLETCHER
BY Amster & Rothstein
ATTORNEYS

RECLINING AND ROCKING CHAIR

Original Filed Feb. 8, 1965 3 Sheets-Sheet 2

INVENTOR.
PETER S. FLETCHER
BY Amster & Rothstein
ATTORNEYS

RECLINING AND ROCKING CHAIR

Original Filed Feb. 8, 1965 3 Sheets-Sheet 3

INVENTOR.
PETER S. FLETCHER
BY Amster & Rothstein
ATTORNEYS

United States Patent Office

Re. 27,231
Reissued Nov. 9, 1971

27,231
RECLINING AND ROCKING CHAIR

Peter S. Fletcher, 200 NW. 15th St.,
Delray Beach, Fla. 33444

Original No. 3,339,972, dated Sept. 5, 1967, Ser. No. 431,013, Feb. 8, 1965. Application for reissue Oct. 22, 1968, Ser. No. 782,495
Int. Cl. A47c *1/02*
U.S. Cl. 297—259 12 Claims

Matter enclosed in heavy brackets [ ] appears in the original patent but forms no part of this reissue specification; matter printed in italics indicates the additions made by reissue.

ABSTRACT OF THE DISCLOSURE

A reclining chair having means for mounting a seat, back-rest and leg rest for reclining movement in an arm frame and having further means for mounting the arm frame on a base for rocking movement on that base. And further including means responsive to reclining movement to lock out or prevent rocking movement and means responsive to rocking movement to lock out and prevent reclining movement.

The present invention relates generally to reclining chairs and particularly to a reclining chair which includes a rocker base such that a chair occupant may either enjoy the normal rocking motion associated with a conventional rocking chair or, alternatively, may use the chair in the manner of a reclining chair. The present invention is particularly concerned with the provision whereby these two separate functions of reclining and rocking may be provided in the same chair without interference one with the other and specifically where rocking movement is automatically prevented in response to reclining movement and, conversely, reclining movement is automatically prevented in response to rocking movement.

In a typical reclining chair there is provided a body-supporting unit, including a seat and back-rest, which is mounted by means of a mounting linkage on an arm frame. The mounting linkage provides for controlled movement of the body-supporting means from a normal upright sitting position to one or more tilted positions. The mounting linkage also provides means by which a leg-rest is supported in a collapsed position when the body-supporting means is in the upright sitting position and in an extended, elevated, leg-supporting position when the seat and back rest are in one of its titled positions. Conventional rocking chairs are of two general types, the first being the type wherein a pair of rocker rails are in engagement with the floor and the entire chair is supported on the rocker rails and rocks thereon. The second type is generally known as a platform rocker and includes a base which is in contact with the floor on which is mounted an arm frame. Normally, a rocking cam is formed on the bottom of the arm frame to provide a rocking engagement between the base and the frame and spring means are provided to hold the two members together and to bias the arm frame into a neutral or median position.

The combination of the desirable performance features of these two types of chairs has, prior to the present invention, been difficult and relatively unsuccessful due to basic interferences between the two operations. It is desirable in constructing a chair which combines the advantageous features of a rocker with the advantageous features of a reclining chair, to provide means to prevent movement of the body supporting unit with respect to the arm frame (i.e., reclining movement) in response to movement of the arm frame with respect to the base unit (i.e., rocking movement). Furthermore, it is advantageous in such a chair to provide lock means preventing rocking movement of the arm frame with respect to the base unit (i.e., rocking movement), in response to movement in the body supporting means with respect to the arm frame (i.e., reclining movement). The present invention is related to a chair having these advantageous features and elements.

Accordingly, it is an object of the present invention to provide a chair which combines the advantageous features of a rocking chair with the advantageous features of a reclining chair.

It is a further object of the present invention to provide a rocking chair with a movable seat and back-rest which may be moved from an upright sitting position into various inclining or reclining positions. More particularly, it is an object of the invention to provide a rocking chair with a body-supporting unit which may be moved into an intermediate, tilted sitting position and then into a fully reclined position.

It is further within the contemplation of the present invention to provide a reclining chair in which the seat and back-rest are movable through a variety of positions in combination with a rocking mechanism whereby the chair occupant may either rock the chair in a normal rocking motion or may move the body-supporting unit into inclined or reclined positions. It is further an object of the invention to provide mechanisms in such a chair which provide automatic blocking of rocking movement in response to inclining movement and automatic blocking of the reclining movement in response to rocking movement.

Generally, it is an object of the present invention to provide a combined rocking and reclining chair which operate automatically and provides improved measures of comfort for the chair occupant.

In accordance with one illustrative embodiment of the present invention there is provided a reclining chair which includes an arm frame unit in which is mounted body-supported means including a seat and back-rest. A mounting linkage is provided mounting the body-supporting means on the arm frame unit for movement with respect thereto from an upright sitting position into one or more titled positions. A base unit is provided to support the chair on a level surface as a floor and rocker means are provided mounting the arm frame unit on the base unit in rocking relationship. In this reclining chair there is provided rocker lock means selectively and rigidly interconnecting the base unit and the arm frame unit for preventing rocking movement therebetween in response to movement of the body-supporting means with respect to the arm frame unit and there is further provided recliner lock means selectively operable for preventing reclining movement of the body-supporting means in response to rocking movement of the arm frame unit with respect to the base unit.

The above brief description, as well as further objects, features, and advantages of the present invention, will be est appreciated by making reference to the following etailed description of one illustrative embodiment of the ıvention, when taken in conjunction with the accompany-ıg drawings wherein.

Figure 4:
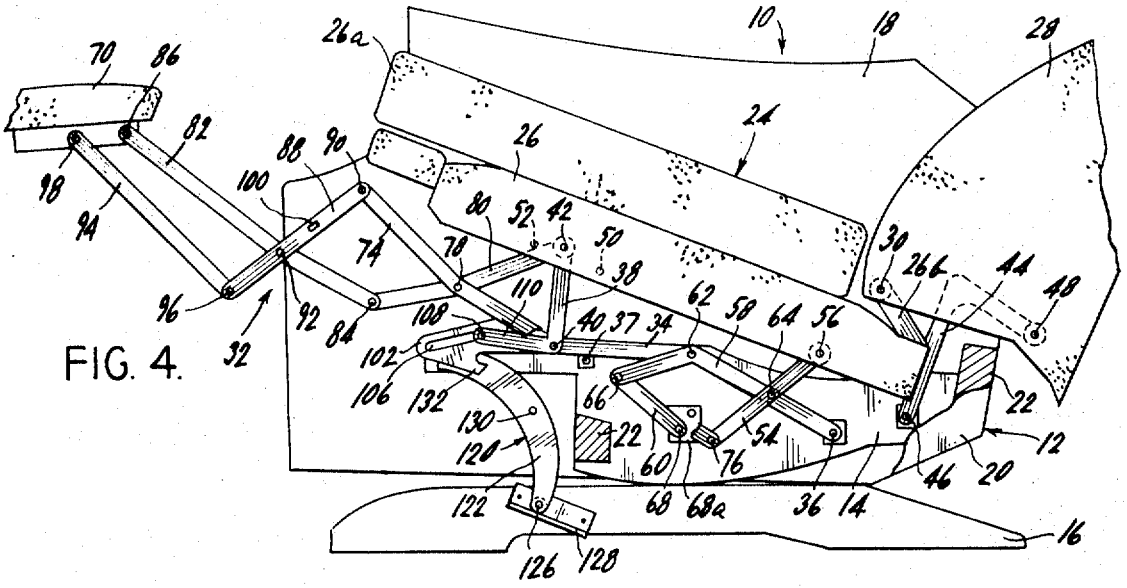
FIG. 4 is a side elevational view similar to that of FIG. illustrating the body-supporting unit in its intermediate, lted sitting position.
Figure 7:
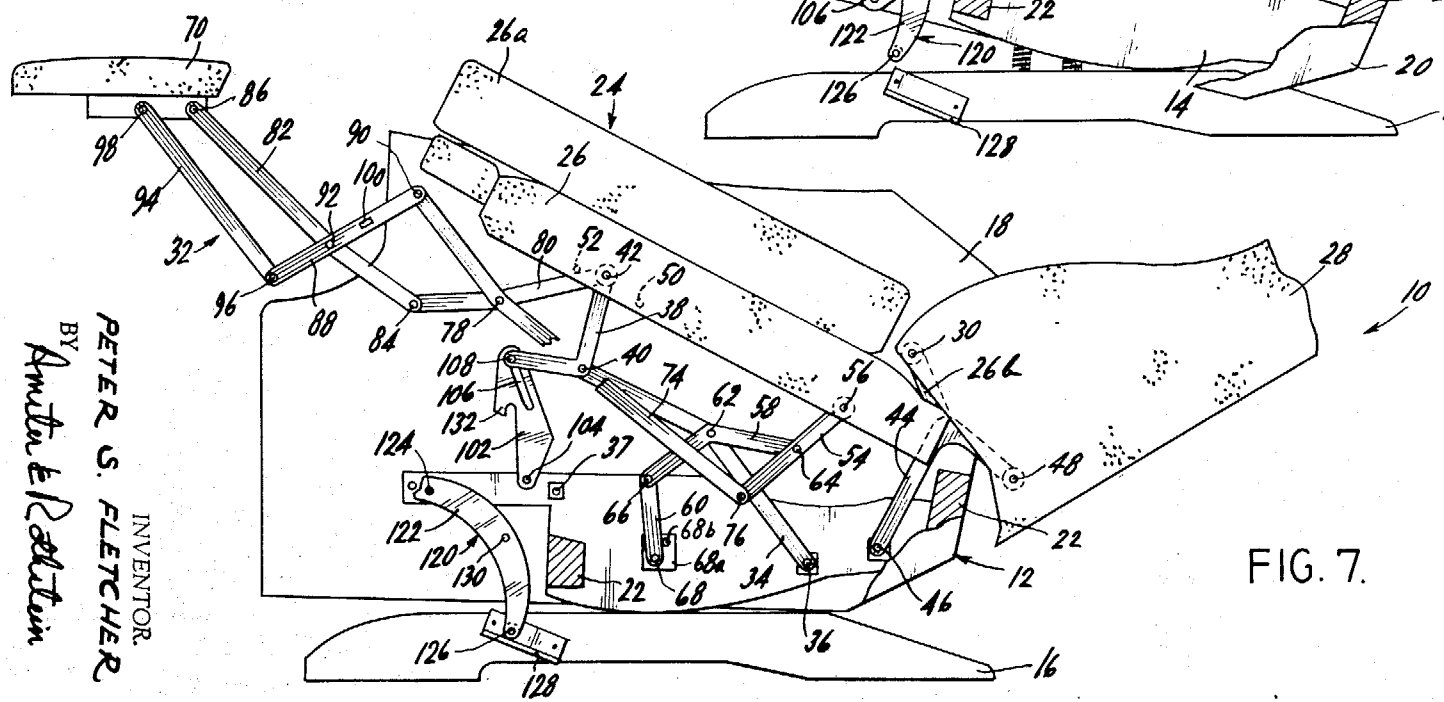
FIG. 7 is a side elevational view similar to FIGS. 1 nd 4 illustrating the various elements of the reclining ıair in the fully reclined position.

Referring now directly to the drawings, there is illus-ated a reclining chair, generally designated by the umeral 10, which incorporates means to provide con-ɛntional rocking motion of the chair and which further ɔvides means to move the body-supporting unit of the ıair from an upright sitting position as illustrated in IG. 1 to an intermediate, tilted sitting position as illus-ated in FIG. 4 and then into the fully reclined position ; illustrated in FIG. 7. The reclining chair 10 includes ı arm frame unit 12 formed at its lower end with a rock-ıg cam 14 which is in rocking contact with a base unit 6. The arm frame unit 12 has a pair of side arms 18, 20 hich are joined together by a series of cross braces 22 ınning from side to side of the arm frame 12. The body-ıpporting unit is generally designated by the numeral 24 ıd includes a seat 26 having a separate seat pillow 26a ıd a back-rest 28. In this particular instance, the seat ıd back-rest are arranged for pivotal movement there-ɛtween by means of the back-rest pivot 30 which joins ıe back-rest 28 to the seat 26 at a seat extension 26b.

Figure 1:
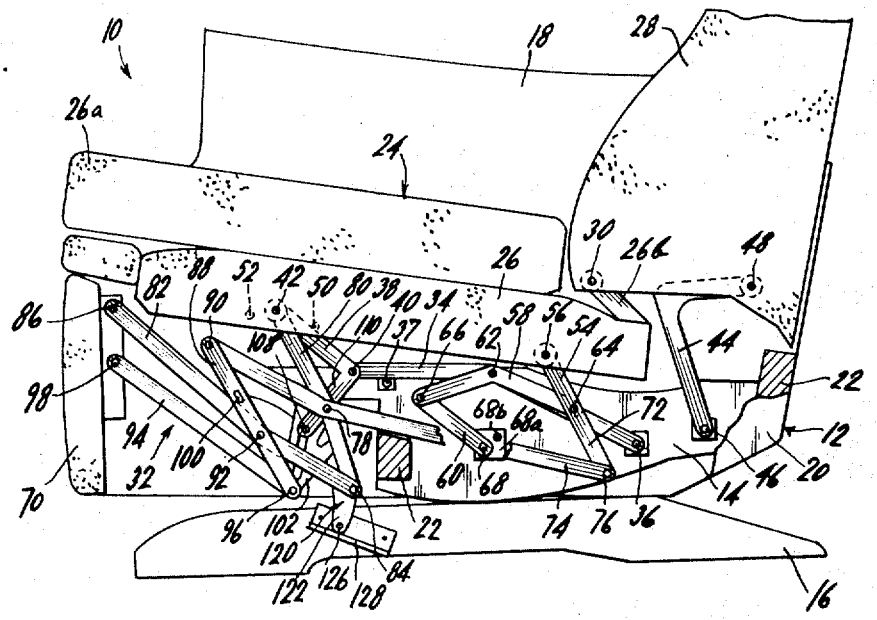
FIG. 1 is a partial side elevational view of a chair ıcorporating structures in accordance with the present ıvention with portions broken away for purposes of larity and particularly illustrating the mounting linkage ɔr the body-supporting means and the leg-rest on the rm frame, the relationship between the arm frame unit nd the base unit and a showing of a portion of a recliner ɔck mechanism.

A mounting linkage, generally designated by the ımeral 32, mounts the body-supporting unit 24 on the ·m frame unit 12 for movement from the upright sitting ɔsition illustrated in FIG. 1 to the intermediate, tilted tting position illustrated in FIG. 4 and then into the ılly reclined position illustrated in FIG. 7. The mount-ıg linkage 32 incorporated in the chair 10 is similar to ıe linkage disclosed in my co-pending application Ser. o. 352,891 entitled Reclining Chair of the Multiple Iovement Type, filed on Mar. 18, 1964. Specifically, the ounting linkage 32 includes a carrier link 34 which is ounted on the arm frame unit 12 at a carrier link pivot 5 and which rests at its forward end on a stop 37 when the body-supporting unit 24 is in the upright sitting position and the intermediate, tilted sitting position. A front guide link 38 is pivotally mounted at a front pivotal mount 40 at the forward end of the carrier link 34 and is pivotally connected to the seat 26 at a front guide link pivot 42. At its rearward end, the body-supporting unit 24 is mounted on the arm frame 12 by a back-rest guide link 44 which is secured at its lower end to the frame 12 at a rear pivotal mount 46 and is connected at its upper end to the back-rest 28 at a back-rest guide pivot 48. The back-rest guide link 44 is curved in order to provide clear-and of the rear cross brace 22 as the chair is moved into the intermediate, tilted sitting position.

During the first movement phase, the body supporting unit 24 is guided by the front guide link 38 and the rear guide link 44 pivoting rearwardly about pivots 40, 46 respectively. In the upright sitting position, the front guide link 38 engages a stop 50 secured to the seat 26 at a point rearwardly on the front guide link pivot 42 to prevent counterclockwise movement of the link 38. The intermediate, tilted sitting position is defined by a further stop 52, also on the seat 26, spaced forwardly from the front guide link 42, which stop 52 engages one of the links of the leg rest mounting portion of the mounting linkage 32 to halt further extension thereof.

The relative angle between the seat 26 and the back-rest 28 is maintained at a constant value during the first movement phase by operation of a first holding link 54 which is pivotally connected to the seat 26 at pivot point 56 spaced rearwardly of the front guide link pivot 40. The holding link 54 serves essentially as a stop during the first movement phase between the seat and back-rest to preclude angular movement therebetween.

Second movement links are provided in the mounting linkage 28 including a three pivot lever 58 and a second holding link 60. The bell crank lever 58 is connected at a first pivot 62 intermediate its ends to the carrier link 34, at a second pivot 64 to the first holding link 54 and a third pivot 66 to the second holding link 60. The second holding link 60 is pivotally mounted to the frame at a second movement holding pivot 68 provided by a mounting plate **68*a*. The bell crank lever 58, the carrier link 34 and the second holding link 60 all remain stationary during the first movement phase providing a substantially fixed pivot 64 for the first holding link 54 to guide the rear end of the seat 26 through a rearward arcuate movement, thereby maintaining a substantially constant angular relationship between the seat 26 and the back-rest 28** during the first movement phase.

A leg-rest 70 is mounted at the forward end of the mounting linkage 32 by a plurality of pairs of crossed links which are driven by a downward extension 72 of the first holding link 54. As the holding link 54 pivots rearwardly during the first movement phase, the downward extension 72 thereof pivots forwardly. This forward movement is transmitted by a supporting link 74 pivotally secured to the downward extension 72 at pivot 76 and is pivoted at 78 to an intermediate point on a first leg-rest link 80. The link 80 is pivotally connected to the seat 26 at the front guide link pivot 42 and is connected at its lower end to a second link 82 at pivot 84. The second link 82 is connected at its forward end to the leg-rest 70 at a first leg-rest pivot 86. The forward end of the supporting link 74 is connected to a third leg-rest link 88 at pivotal connection 90 which third leg-rest link crosses over the second leg-rest link 82 and is pivoted thereto at pivot 92 intermediate its ends. At its lower end, the third leg-rest link 88 is pivoted to a fourth leg-rest link 94 by pivot 96 with the fourth leg-rest link 94 connected at its forward end to the leg-rest 70 at a second leg-rest pivot 98. A raised stop 100 is formed on the third leg-rest link 88 for engagement with the second leg-rest link 82 in the upright sitting position in order to positively define the collapsed position of the leg rest 70. As may be seen by inspecting FIG. 4, the stop 52 on the seat 26 engages the first leg-rest link 80 at the end of the first movement phase to define the intermediate, tilted sitting position.

The described mounting linkage 32 provides for movement of the body-supporting unit 24 through a second movement phase from the intermediate, tilted sitting position of FIG. 4 to the fully reclined position of FIG. 7 position. The second movement phase includes pivotal movement of the back rest 28 about the back rest pivot 48, upward pivotal movement of the carrier link 34 about the carrier link pivot 36, upward movement of the first holding link 54 with the carrier link 34 and complementary movement of the bell crank lever 58 and the second holding link 60. Movement from the fully reclined position to the intermediate, tilted sitting position and then to the upright sitting position is accomplished by reversing the various operations stated above.

It should be noted that in the present construction, all pivotal attachments to the seat 26 and back-rest 28 of the body supporting unit 24 are made on the inside of the side rails of those units and the complementary units of the links of the mounting linkage 32 to the arm frame 12 are made on the outside surfaces of the rocker cam 14 of the arm frame unit 12. Accordingly, all of the various elements are outside of the casual observer's view. The particular location of the mounting of these elements differs somewhat from that of the more commonly known reclining chair; however, the operation is the same.

A sequencing mechanism for the reclining chair 10 is provided and includes a sequencing link 102 pivotally mounted on the arm frame unit 12 at pivot 104. The sequencing link 102 has formed therein a slot 106 which receives therein a pin 108 which is carried by a downward extension 110 of the front guide link 38. It will be appreciated that during the first movement phase, as the front guide link 38 pivots in a clockwise direction about the pivot point 40, the downward extension 110 will also pivot in a clockwise direction. The pivot 104 for the sequencing link 102 is, during the first movement phase, coaxial with the front guide link pivot 40. The sequencing link 102 will therefore be carried through a clockwise movement with the extension 110 of the front guide link 38 until it reaches a position as shown in FIG. 4. During this motion, the pin 108 remains at the end of the slot 106 closest to the pivot point 104. When the intermediate, tilted sitting position is reached, the sequencing link 102 has rotated in an amount sufficient such that the pin 108, if moved upwardly, can further rotate the sequencing link 102 and slide along the slot 106 to its outer end. It will be appreciated that upward movement of the pin 108 prior to reaching the intermediate, tilted sitting position of the chair is precluded by the blocking action of that portion of the sequencing link 102 between the innermost end of the slot 106 and the pivot 104. As may be seen by comparing FIGS. 4 and 7, during the second movement phase the sequencing link 102 pivots further in a clockwise direction, the pin 108 travels to the outer end of the slot 106 and the carrier link 34 is allowed to pivot upwardly about its pivotal mount 36. The fully reclined position is defined by the pin engaging the outer end of the slot 106 and/or the second holding link engaging the stop pin 68b (see FIG. 7).

The recliner lock

Figure 2:
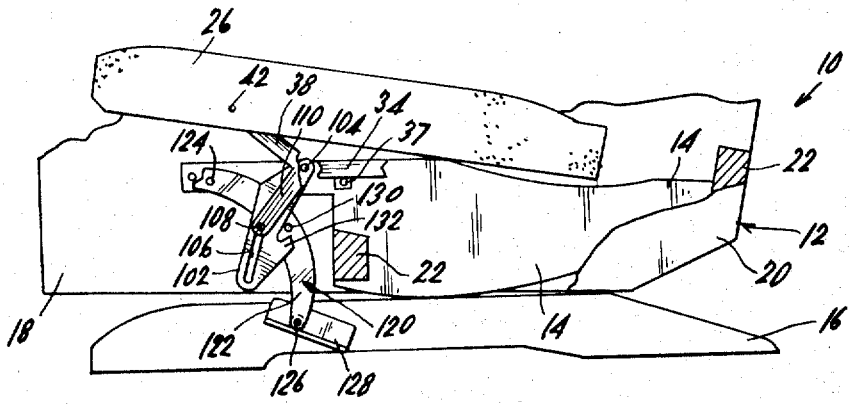
FIG. 2 is a side elevational view similar to that of FIG. with many of the elements of the mounting linkage ɛmoved for purposes of clarity such that the recliner ɔck mechanisms may be clearly seen.
Figure 8:
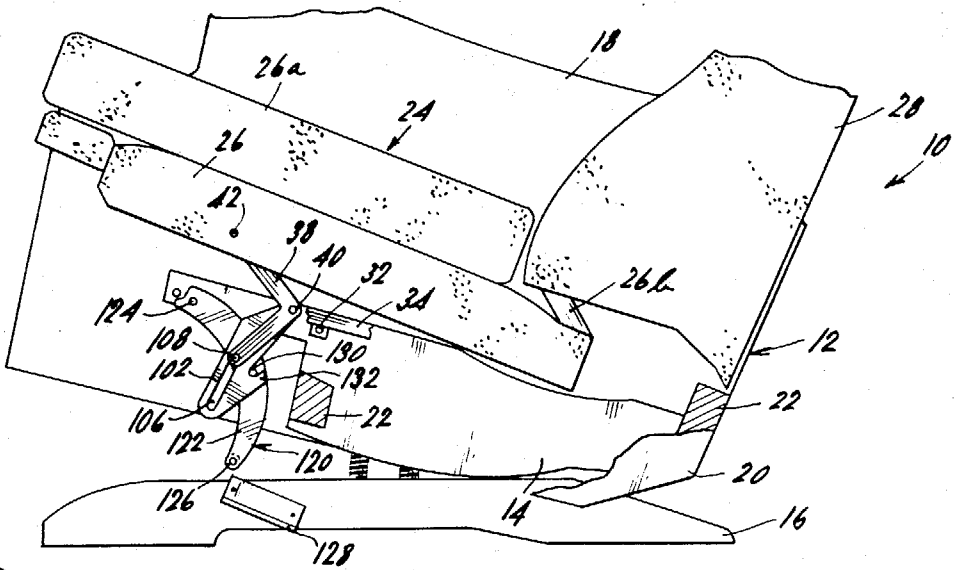
FIG. 8 is a side elevational view of a chair in accord-ıce with the present invention similar to FIG. 2 illus-ating the recliner lock mechanism in active engagement hen the chair is rocked into a relatively steep rearward osition.

References were merely made to FIGS. 2, 4 and 8 for a description of the recliner lock which has been generally designated by the numeral 120. Prior to a specific description of the various elements of the recliner lock in the chair 10, it should be understood that this mechanism includes means which are selectively and automatically operable for preventing movement of the body-supporting unit 24 with respect to the arm frame unit 12 in response to movement of the arm frame unit 12 in a rocking mode. The recliner lock 120 generally comprises means which act to prevent movement of the various elements of the mounting linkage 32 in response to movement in the chair 10 in its rocking mode of operation. Specifically, when the chair occupant shifts his weight rearwardly in order to cause the arm frame 12 to rock on the base unit 16, the recliner lock mechanism automatically assumes its active position thereby preventing movement of the body-supporting unit 24 out of its upright sitting position. Forward rocking movement releases the recliner lock 120 allowing the chair occupant to move the body-supporting means 24 into the various reclining positions. In the present embodiment, the locking action is applied to the front guide link 38 through its downward extension 110 and through the engagement of that extension with the sequencing link 102. In this respect, the sequencing link 102 is utilized as a portion of the lock mechanism. As a description of the lock mechanism 120 proceeds it will be clear that the designer has a choice of a wide variety of locations to apply the locking mechanism. Basically, the essential requirement is that some element or point which normally moves during initial movement of the body-supporting unit 24 out of the upright sitting position be blocked in order to prevent such movement.

Referring specifically to FIGS. 2 and 8, it will be seen that there is a locking bar 122 pivotally mounted on the arm frame unit 12 at a forward extension of the rocker cam 14 at locking pivot 124. At its lower end, the locking bar 122 has a roller 126 which is normally engaged with an inclined element 128. Since the locking bar 122 is biased downwardly by gravity, the roller 126 normally is engaged with the element 128. When the arm frame 12 is tilted rearwardly, on the rocker cam 14, the forward part of the arm frame 12 is raised upwardly thus elevating the locking pivot 124 and thus causing relative rotation of the locking bar 122 about the locking pivot 124.

A locking pin 130 is rigidly secured to the locking bar 122 and is engageable with a hook section 132 formed along one edge of the sequencing and locking link 102. When the chair is in its upright sitting position, the hook section 132 is facing upwardly and rearwardly in direct alignment with the location of the locking pin 130 when the arm frame 12 is positioned in its medium location with respect to the base unit 16. However, when the arm frame 12 is tilted rearwardly about the rocking cam 14 the locking bar 122 falls downwardly under the influence of gravity pivoting about the locking pivot 124 and allowing the locking pin 130 to fall into the open locking hook 132. Engagement of the locking pin 130 and the locking hook 132 is clearly illustrated in FIG. 8. Of course, understanding of the operation of the mounting linkage 32 will make it obvious that once the pin 130 is engaged within the locking hook 132, all motion of the mounting linkage and, therefore, all motion of the body-supporting unit 24 with respect to the arm frame 12, is blocked.

The simple concept of operation of the recliner lock 120 is that a control point on the mounting linkage which moves in the beginning of first movement phase is held rigid with the arm frame unit 12 thereby holding the entire mounting linkage rigid and thus preventing movement of the body-supporting unit during the first movement phase. The means which actuate the lock are responsive only to rearward rocking movement. Thus, during rocking movement, the recliner lock 120 is alternatively locked in response to rearward rocking movement and unlocked in response to forward rocking movement. It will be appreciated that the control point in the illustrative embodiment is the locking hook 132 (it could be, for example, any point on the sequencing link 102 or on the downward extension 110 of the front guide link or on the front guide link 38 itself) and the point which is rigid with the arm frame 12 is the locking pin 130 on the locking bar 122 which, when pivoted around the locking pivot 124, forms a rigid link between the locking hook 132 and the arm frame 12 at the locking pivot 124. It is clear, once the concept of operation of the recliner lock mechanism is appreciated, that a large variety of locking mechanisms may be construed which will block movement of ıe seat and back-rest unit in response to rocking movement of the arm frame 12 with respect to the base unit 16.

The rocker lock

Figure 3:
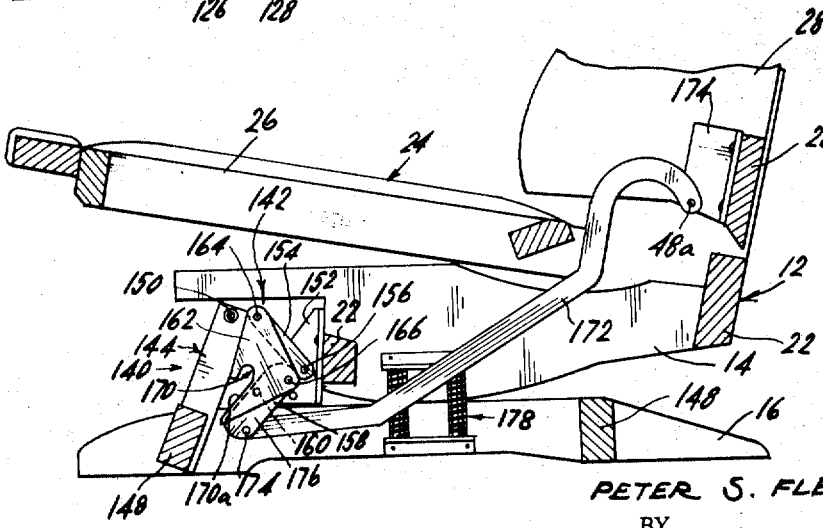
FIG. 3 is a central sectional view taken along the front ɔ rear center line of the chair of FIG. 1 illustrating the ɔcker lock mechanism employed in the present embodi-ıent of the invention.
Figure 5:
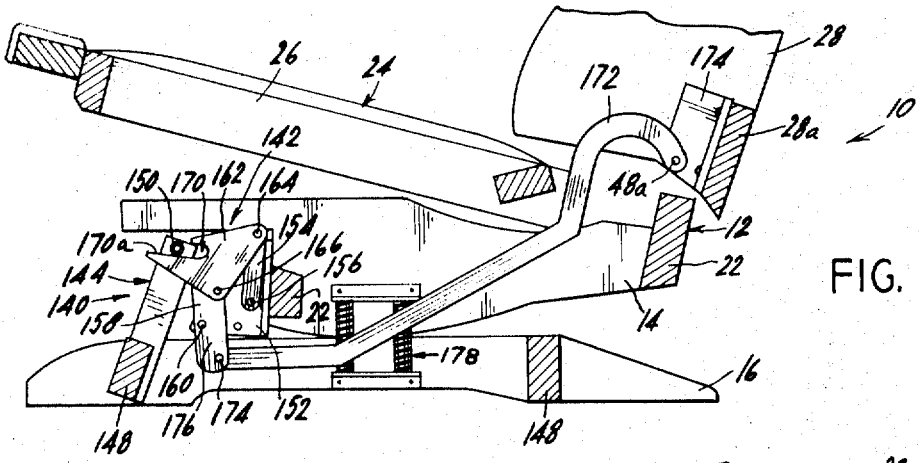
FIG. 5 is a central sectional view similar to that of IG. 3 illustrating the rocker lock mechanism when the ıair is moved out of the upright sitting position but ot completely moved into the intermediate, tilted sitting osition.
Figure 6:
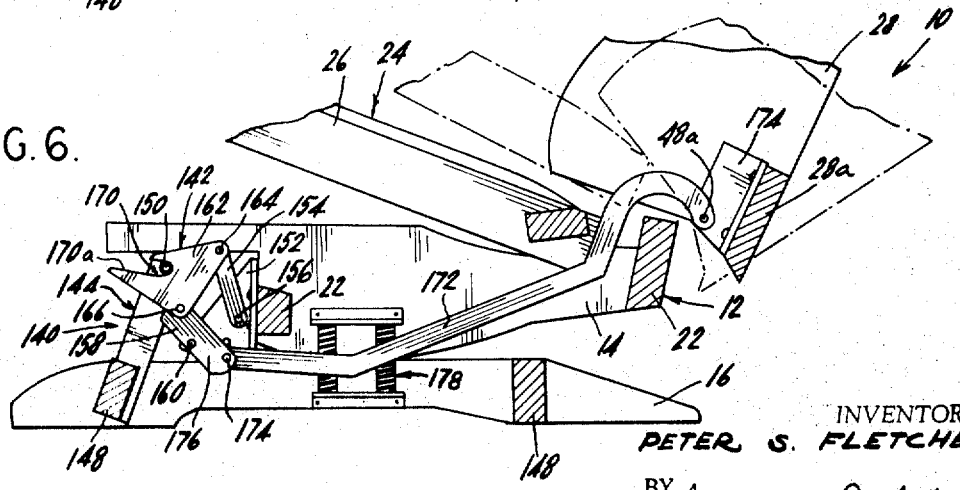
FIG. 6 is similar to drawing of FIG. 5 illustrating in ɔlid line configuration the position of the rocker lock ıechanism at the intermediate tilted sitting position, nd further illustrating, in dotted line configuration, the ırther movement of the seat and back-rest into the fully ɛclined position.

Reference will now be made to FIGS. 3, 5 and 6 for description of the rocker lock means incorporated in ıe chair in accordance with the present invention. Beore specific description is made of the various elements 'hich provided this locking function, it should be underood that it is desirable to have means whereby rocking ıovement of the arm frame unit 12 with respect to the ase unit 16 is blocked when the body-supporting unit and eg-rest are moved out of the upright sitting position. The ocation of the center of gravity of the physical system omprising the chair occupant, the seat, the back-rest, ıe leg-rest and the arm frame changes as the chair moves ırough the first and second movement phases. This hange in the location of the center of gravity, absent the ocker lock, would cause an undesirable tilting and irritability of that physical system on the rocker base as ıe body-supporting unit is moved through its movements hases. The rocker lock illustrated in FIGS. 3, 5 and 6 is esignated by the numeral 140 and generally includes a rst member on the arm frame unit 12 and a second memer on the support unit 16 and means to interconnect the rst and second members in response to movement in the ody supporting unit 24 with respect to the arm frame nit 12.

The rocker lock 140 includes a first portion, generally esignated 142, mounted on the arm frame unit 12 and second portion, generally designated 144, mounted on ıe support unit 16. The second rocker lock portion 144 omprises a length of angle iron 146 which is rigidly seured to the forward cross brace 148 of the support unit 6 and extends upwardly and rearwardly therefrom. As 'ill be described below, the entire rocker lock 140, and ıe first and second portions 142, 144 are mounted aproximately along the front to rear center line of the chair 0 to insure alignment even if the rocking cam 14 is kewed with respect to the base unit 16. At its upper end, ıe first portion 144 is provided with a locking stud 150 'hich, in this embodiment, is formed of a pin rigidly seured to the angle iron 144 which pin is covered with a ylindrical nylon sleeve.

The second portion 142 of the rocker lock 140 is mountd on the forward cross brace 22 of frame unit 12 and omprises a four-bar linkage, one of the links of which adapted to hook onto the locking stud 150 when the ocker lock 140 is actuated. Specifically, the second poron 142 includes a mounting bracket 152 which is rigidly ecured to the forward cross brace 22 of the frame 12 nd which serves as the stationary link of the four-bar nkage. A first movable link 154 is connected to the racket 152 at pivot 156 and a second movable link 158 pivotally connected to the bracket 152 at the pivot 160 t a point spaced from the pivotal connection 156. Interonnecting the first and second movable links 154, 158, is third movable link or locking link 162 which is pivotlly secured to the first movable link 154 at pivot 164 nd is pivotally secured to the second movable link 158 t pivot 166. A hooked or three-sided opening 170 is ormed along one edge of the locking or movable link 62 adapted to be engaged with the locking stud 150. The our-bar linkage 152, 154, 158, 162 has a path of moveıent which causes the sides of the hooked opening 170 engage themselves about the locking stud 150. The ath of movement described by this four-bar linkage may e best appreciated by progressively studying FIGS. 3, 5 nd 6. It will be seen that in the upright sitting position f FIG. 3, the rocker lock mechanism is completely inctive with no interconnection between the first portion 42 and the second portion 144. In the position of FIG. , which is at a point within the first movement phase f the reclining chair 10, it will be seen that the four-bar nkage of the second portion 142 is moved to some extent and that the lower elongated flat portion 170a of the locking hook 170 has engaged the bottom of the locking stud 150. It will be further seen, by inspecting FIG. 6, that at the intermediate, tilted sitting position of the chair 10, the locking link 162 has been moved further forward to completely engage the locking stud 150 within the confines of the hooked opening 170. In the embodiment shown here, the long nose of the hooked opening 170, that is the tip of the flat portion 170a remains slightly below the level of the locking stud 150 at all times during a rocking cycle providing an inherent safety device preventing extreme rearward movement. Furthermore, the center line location of the rocker lock 140 in combination with the shape of the hooked opening 170 and the path of movement of the four-bar linkage 152 insures operation even if the arm frame 12 and rocking cam 14 become misaligned with respect to the base unit 16.

The actuation of the rocker lock 140 is accomplished by mechanisms which link one of the two locking portions 142, 144 to an element of the body-supporting unit 24 which moves during the first movement phase thereby to move the rocker lock 140 quickly from its inoperative position as shown in FIGS. 5 and 6 in response to movement in the first movement phase. Specifically, an actuating and connecting link 172 is pivotally attached at 174 to a downward extension 176 of the second movable link 158. At its other end, the actuating link 172 is connected to a pivot 48a on a mounting bracket 174 secured to the back-rest 28 at a back-rest cross brace 28a. The pivot 48a is coaxial with the back-rest guide pivot 48. As will readily be apparent by comparing FIGS. 1 and 4, the back-rest 28 moves rearwardly of the arm frame unit 12 during the first movement phase as the rear guide link 44 pivots rearwardly, in a clockwise movement, about the rear pivotal mount 46. Accordingly, the pivotal connection 48a to the back-rest 28 of the actuating and connecting link 172 (which is coaxial with the back-rest guide pivot 48) also moves rearwardly thus pulling the actuating link 172 and its pivotal connection 174 on the lower extension 176 of the second movable link 158 rearwardly and causing that movable link 158 to pivot in a counter clockwise direction thereby actuating the rocker lock 140. The actuation of the rocker lock 140 causes an initial rapid upward movement of the locking link 162 and then a forward movement thereof during which time the hooked opening 170 is engaged about the locking stud 150. The complete locking position as shown in FIG. 6 is realized at the end of the first movement phase. It will of course be appreciated that during the first movement phase, and at the beginning portions thereof, the hooked locking link 162 is moved quickly upwardly such that the long flat surface 170a thereof is quickly brought into engagement with the lower surface of the locking stud 150. When the chair occupant shifts his weight rearwardly initialling the first movement phase, only rearward rocking movement need be blocked; of course, rearward weight shifting could not produce forward rocking movement. Therefore, the engagement of the flat portion 170a with the lower surface of the locking stud 150 is sufficient to prevent any rocking which might otherwise occur at the beginning of the first movement phase. Complete positive locking, in both forward and rearward directions, is accomplished at a later point during the first movement phase (see FIG. 6).

As it most clearly illustrated in FIG. 6, the locking position of the rocker lock 140 is maintained during the second movement phase as the body-supporting unit 24 moves from the intermediate, tilted sitting position to the fully reclined position because there is no relative movement between the pivotal mount 48a of the actuating link 172 and the arm frame 12 being the second movement phase. This may be best appreciated by considering the solid line position of the back-rest 28 in FIG. 6 in comparison with the dotted line configuration of the back-rest. The solid line configuration is the same as that shown in FIG. 4 whereas the dotted line configuration is in the same position as shown in FIG. 7, i.e., the intermediate, tilted sitting position and the fully reclined position respectively. Accordingly, the rocker lock 140 remains in its engaged position during the second movement phase.

The rocker lock 140 is unlocked by a reversal of the movement of the body-supporting unit 24 within the arm frame 12. Specifically, there is no relative movement of the elements as the seat and back-rest are moved from the fully reclined position to the intermediate, tilted sitting position; there is an unlocking and a withdrawal of the locking link 162 during the motion from the intermediate, tilted sitting position to the upright sitting position.

From the foregoing, it will be appreciated that there is provided in accordance with the present invention a combined reclining and rocker chair which incorporates automatically operable locking devices to prohibit rocking movement in response to reclining movement of the chair and, conversely, to prohibit reclining movement in response to rocking movement of the chair. Although the advantages of such a system are obvous to those skilled in the art, it should be pointed out that the completely automatic operation of these locking mechanisms provide a large measure of improvement for chairs of this general type. Specifically, the chair occupant of a chair incorporating the present invention, such as the chair illustrated herein, need not understand the operation of the chair in order to make it function properly, and needed not take any special care in moving the chair through its various movements. All that is required is that the chair occupant sit in the chair and rock (if he desires rocking) or lean back and recline (if he desires to recline).

Although there has been only one reclining chair disclosed herein which incorporates the present invention, there are many analogous structures which can be devised to perform the same advantageous features and which would constitute other embodiments of the invention. Accordingly, the following claims should be construed broadly, in a manner consistent with the spirit and scope of the invention.

What I claim is:

1. A rocking and reclining chair comprising an arm frame unit, body-supporting means including a seat and a back-rest, a mounting linkage mounting said body-supporting means on said arm frame unit for movement with respect thereto from an upright sitting position into a tilted position, a base unit for supporting said reclining chair on a level surface, means mounting said arm frame unit on said base unit in rocking relation thereto, rocker lock means selectively and rigidly interconnecting said base unit and said arm frame unit for preventing rocker movement therebetween in response to movement of said body-supporting means with respect to said arm frame, and recliner lock means selectively engageable with said mounting linkage for preventing movement of said body-supporting means with respect to said arm frame unit in response to rocking movement of said arm frame unit with respect to said base unit.

2. A rocking and reclining chair comprising an arm frame unit, body-supporting means including a seat and a back-rest, a mounting linkage mounting said body-supporting means on said arm frame unit for movement with respect thereto from an upright sitting position into a tilted position, a base unit for supporting said reclining chair on a level surface, means mounting said arm frame unit on said base unit in rocking relation thereto, and recliner lock means selectively operable for preventing movement of the body-supporting means with respect to said arm frame unit in response to rocking movement of said arm frame unit with respect to said base unit.

3. A rocking and reclining chair comprising an arm frame unit, body-supporting means including a seat and a back-rest, a mounting linkage mounting said body-supporting means on said arm frame unit for movement with respect thereto from an upright sitting position into a tilted position, said mounting linkage having at least one link which moves at the start of movement of said body-supporting unit with respect to said arm frame unit, a base unit for supporting said reclining chair on a level surface, means mounting said arm frame unit on said base unit in rocking relation thereto, and recliner lock means selectively engageable with said moving element of said mounting linkage for preventing movement of the body-supporting means with respect to said arm frame unit in response to rocking movement of said arm frame unit with respect to said base unit.

4. A rocking and reclining chair comprising an arm frame unit, body-supporting means including a seat and a back-rest, a mounting linkage mounting said body-supporting means on said arm frame unit for movement with respect thereto from an upright sitting position into a tilted position, said mounting linkage having at least one link which moves at the start of movement of said body-supporting unit with respect to said arm frame unit, a base unit for supporting said reclining chair on a level surface, means mounting said arm frame unit on said base unit in rocking relation thereto, rocker lock means selectively and rigidly interconnecting said base unit and said arm frame unit for preventing rocker movement therebetween in response to movement of said body-supporting means with respect to said arm frame, rocker lock actuation means interconnecting said rocker lock and said mounting linkage, and recliner lock means selectively engageable with said moving element of said mounting linkage for preventing movement of the body-supporting means with respect to said arm frame unit in response to rocking movement of said arm frame unit with respect to said base unit.

5. A reclining chair comprising an arm frame unit, body-supporting means including a seat and a back-rest, a mounting linkage mounting said body supporting means on said arm frame unit for movement from an upright sitting position into a tilted position, a base unit for supporting said reclining chair, means mounting said arm frame unit in rocking engagement with said base unit, and rocker lock means selectively and rigidly interconnecting said base unit and said arm frame unit for preventing rocking movement therebetween including a first portion rigidly connected to one of said units, a second portion operatively connected to the other of said units and rigidly engageable with said first portion for preventig rocking movement therebetween, and rocker lock actuating means operatively interconnecting said second member and a movable element of said mounting linkage for automatically moving said second portion quickly into engagement with said first portion in response to initial movement of said body-supporting means out of said upright sitting position for preventing rocking of said arm frame unit on said base unit.

6. A reclining chair comprising an arm frame unit, body-supporting means including a seat and a back-rest, a mounting linkage mounting said body supporting means on said arm frame unit for movement from an upright sitting position into a tilted position, a base unit for supporting said reclining chair, means mounting said arm frame unit in rocking engagement with said base unit, rocker lock means selectively and rigidly interconnecting said base unit and said arm frame unit for preventing rocking movement therebetween including a first portion rigidly connected to said base unit, a second portion operatively connected to said arm frame unit and rigidly engageable with said first portion for preventing rocking movement therebetween, said first portion having a locking element, said second portion having a moveable link engageable in locking arrangement with said locking element, and rocker lock actuating means operatively interconnecting said second portion and a moveable element of said mounting linkage for automatically moving said moveable link of said second portion quickly into engagenent with said locking element of said first portion in response to initial movement of said body-supporting means out of said upright sitting position for preventing rocking of said arm frame unit on said base unit.

7. A reclining chair comprising an arm frame unit, body-supporting means including a seat and a back-rest, a mounting linkage mounting said body supporting means on said arm frame unit for movement from an upright sitting position into a tilted position, a base unit for supporting said reclining chair, means mounting said arm frame unit in rocking engagement with said base unit, rocker lock means selectively and rigidly interconnecting said base unit and said arm frame unit for preventing rocking movement therebetween including a first portion rigidly connected to one of said units, a second portion operatively connected to the other of said units and rigidly engageable with said first member for preventing rocking movement therebetween, and rocker lock actuating means operatively interconnecting said second portion and a movable element of said mounting linkage for automatically moving said second portion quickly into engagement with said first portion in response to initial movement of said body-supporting means out of said upright sitting position for preventing rocking of said arm frame unit on said base unit, recliner lock means selectively operable for preventing tilting movement of said body-supporting means with respect to said arm frame unit, said mountng linkage including a first link having a first control point and a second link having a second control point, said first and second control points moving with respect to each other during initial movement of said body-supporting means out of said upright sitting position, said recliner lock means comprising a selectively engageable stop operatively engageable between said first and second control points for preventing movement therebetween, and recliner lock actuating means operatively engaged with said stop means for automatically engaging said stop between said control points in response to rocking of said arm frame unit on said base unit for preventing movement of said body supporting means during rocking movement.

8. A reclining chair comprising an arm frame unit, body-supporting means including a seat and a back-rest, a mounting linkage mounting said body supporting means on said arm frame unit for movement from an upright sitting position into a tilted position, a base unit for supporting said reclining chair, means mounting said arm frame unit in rocking engagement with said base unit, recliner lock means selectively operable for preventing tilting movement of said body-supporting means with respect to said arm frame unit, said mounting linkage including a first link having a first control point and a second link having a second control point, said first and second control points moving with respect to each other during initial movement of said body-supporting means out of said upright sitting position, said recliner lock means comprising a selectively engageable stop operatively engageable between said first and second control points for preventing movement therebetween, and recliner lock actuating means operatively engaged with said stop means for automatically engaging said stop between said control points in response to rocking of said arm frame unit on said base unit for preventing movement of said body supporting means during rocking movement.

9. A reclining chair comprising an arm frame unit, body-supporting means including a seat and a back-rest, a mounting linkage mounting said body supporting means on said arm frame unit for movement from an upright sitting position into a tilted position, a base unit for supporting said reclining chair, means mounting said arm frame unit in rocking engagement with said base unit, rocker lock means selectively and rigidly interconnecting said base unit and said arm frame unit for preventing rocking movement therebetween and rocker lock actuating means operatively connected to said rocker lock means for automatically actuating same in response to initial movement of said body-supporting means out of said upright sitting position for preventing rocking of said arm frame unit on said base unit, recliner lock means selectively operable for preventing tilting movement of said body-supporting means with respect to said arm frame unit, said mounting linkage including a first link having a first control point and a second link having a second control point, said first and second control points moving with respect to each other during initial movement of said body-supporting means out of said upright sitting position, said recliner lock means comprising a selectively engageable stop operatively engageable between said first and second control points for preventing movement therebetween, and recliner lock actuating means operatively engaged with said stop means for automatically engaging said stop between said control points in response to rocking of said arm frame unit on said base unit for preventing movement of said body supporting means during rocking movement.

10. A reclining chair comprising an arm frame unit, body-supporting means including a seat and a back-rest, a mounting linkage mounting said body supporting means on said arm frame unit for movement from an upright sitting position into a tilted position, a base unit for supporting said reclining chair, means mounting said arm frame unit in rocking engagement with said base unit, rocker lock means selectively and rigidly interconnecting said base unit and said arm frame unit for preventing rocking movement therebetween including a first portion rigidly connected to one of said units, a second portion operatively connected to the other of said units and rigidly engageable with said first portion for preventing rocking movement therebetween, and rocker lock actuating means operatively interconnecting said second portion and a movable element of said mounting linkage for automatically moving said second portion quickly into engagement with said first portion in response to initial movement of said body-supporting means out of said upright sitting position for preventing rocking of said arm frame unit on said base unit, recliner lock means selectively operable for preventing tilting movement of said body-supporting means with respect to said arm frame unit, said mounting linkage including a first link having a first control point and a second link having a second control point, said first and second control points moving with respect to each other during initial movement of said body-supporting means out of said upright sitting position, said recliner lock means comprising a selectively engageable stop operatively engageable between said first and second control points for preventing movement therebetween, and recliner lock actuating means operatively engaged with said stop means for automatically engaging said stop between said control points in response to rocking of said arm frame unit on said base unit for preventing reclining movement of said body supporting means during rocking movement.

*11. A rocker-recliner chair having a base, a chassis mounted on said base for rocking movement and reclining movement relative to said base, a footrest operatively connected to said chassis, linkage means operable upon reclining movement of said chassis to actuate said footrest and prevent rocking movement of said chair and operable upon rocking movement of said chair to prevent reclining movement of said chair and actuation of said footrest, said prevention of rocking movement occurring substantially simultaneously with the initiation of reclining movement of said chassis, and said prevention of reclining movement occurring substantially simultaneously with the initiation of rocking movement of said chassis.*

*12. A rocker-recliner chair including a base, a chassis mounted on said base, said chassis having a plurality of said frame members, a mounting plate attached to each side frame member, linkage means mounted on each said main mounting plate and operatively connected between*

*each said side frame member and said base, a footrest mounted on said linkage means, said linkage means operable to permit a first reclining movement of said chassis and actuation of said footrest, and a second rocking movement of said chassis relative to said base, said linkage mechanism being operable to block rocking movement of said chassis upon reclining movement of said chassis and operable to block reclining movement of said chassis and actuation of said footrest upon rocking movement of chassis, said prevention or rocking movement occurring substantially simultaneously with the initiation of reclining movement of said chassis, and said prevention of reclining movement occurring substantially simultaneously with the initiation of rocking movement of said chassis.*

References Cited

The following references, cited by the Examiner, are of record in the patented file of this patent or the original patent.

UNITED STATES PATENTS

| | | | |
|---|---|---|---|
| 2,963,077 | 12/1960 | Knabusch et al. | 297—265 |
| 3,043,621 | 7/1962 | Fletcher | 297—85 |
| 3,069,201 | 12/1962 | Belisle et al. | 297—316 X |
| 3,093,409 | 6/1963 | Fletcher | 297—89 |
| 3,096,121 | 7/1963 | Knabusch et al. | 297—269 |
| 3,104,128 | 9/1963 | Schliephacke | 297—355 X |
| 3,141,700 | 7/1964 | Fletcher | 297—89 X |
| 3,162,483 | 12/1964 | Fletcher | 297—89 |
| 3,163,464 | 12/1964 | Martin et al. | 297—85 |
| 3,279,847 | 10/1966 | Re | 297—271 |

JAMES T. McCALL, Primary Examiner

U.S. Cl. X.R.

297—83